United States Patent
Ovadia et al.

(10) Patent No.: US 6,400,720 B1
(45) Date of Patent: Jun. 4, 2002

(54) METHOD FOR TRANSPORTING VARIABLE LENGTH AND FIXED LENGTH PACKETS IN A STANDARD DIGITAL TRANSMISSION FRAME

(75) Inventors: Shlomo Ovadia, Yardley; Robert Mack, Collegeville, both of PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/337,064

(22) Filed: Jun. 21, 1999

(51) Int. Cl.[7] .................. H04L 12/28; H04L 12/43; H04N 7/10; H04H 1/00
(52) U.S. Cl. .............. 370/395.64; 370/395.2; 370/465; 370/474
(58) Field of Search ............... 370/395.5, 395.51, 370/395.52, 396.6, 395.64, 395.65, 465, 470, 471, 473, 474

(56) References Cited

U.S. PATENT DOCUMENTS

| | | | | |
|---|---|---|---|---|
| 5,570,355 A | * | 10/1996 | Dail et al. ................. | 370/352 |
| 5,742,599 A | * | 4/1998 | Lin et al. ................. | 370/395.64 |
| 5,774,665 A | * | 6/1998 | Jeong et al. ........... | 370/395.53 |
| 5,930,265 A | * | 7/1999 | Duault et al. ............... | 370/473 |
| 5,991,912 A | * | 11/1999 | Mao ....................... | 370/395.64 |
| 6,028,860 A | * | 2/2000 | Laubach et al. ........ | 370/395.64 |
| 6,041,054 A | * | 3/2000 | Westberg ................. | 370/389 |

\* cited by examiner

*Primary Examiner*—Ricky Ngo
(74) *Attorney, Agent, or Firm*—Barry R. Lipsitz

(57) ABSTRACT

A method is provided for transporting variable length packets such as IP packets and fixed length packets of length N, such as MPEG video packets, in standard digital transmission frames such as DS-3 frames. Each frame comprises a plurality P of sections having a fixed length M which is greater than N. A fixed length trailer is added to each of the variable length packets. Each variable length packet with the added trailer is segmented into an integer number of segmented packets of length N. Padding bits are added if necessary to provide the integer number of segmented packets. A header and trailer are added to each of the segmented packets and fixed length packets to expand them into an expanded packet length M. P of the expanded packets are combined into a frame for transmission.

12 Claims, 4 Drawing Sheets

METHOD FOR TRANSPORTING VARIABLE LENGTH AND FIXED LENGTH PACKETS IN A STANDARD DIGITAL TRANSMISSION FRAME

BACKGROUND OF THE INVENTION

The present invention relates to the communication of cable television signals, and more particularly to the communication of Motion Picture Experts Group (MPEG) video signals and Internet protocol (IP) signals in a standard digital transmission frame format, such as DS-3, over a hybrid fiber coax (HFC) network.

Cable television operators have rapidly been installing digital technology for use with their existing hybrid fiber/coax network. Such technology utilizes a digital set-top box, which converts the signals received over the HFC network for reproduction on a subscriber's television set or other video appliance, such as a video tape recorder. Current digital set-top boxes operate, for example, in either a 64-QAM (quadrature amplitude modulation) or 256-QAM mode for downstream transmission and have a built-in radio frequency (RF) return path modem. These boxes enable a host of emerging interactive services to be provided, including Internet access and Video-on-Demand services. Future digital set-top boxes with a built-in cable modem will enable even more advanced services such as video streaming, IP telephony, high definition (HD) television, digital games, and the like.

In order to transmit HD signals to a subscriber via the existing HFC network, cable operators currently have only one choice. This is to replace the subscriber digital set-top box with a new set-top box that can receive off-air HD signals using 8-VSB (vestigial side band) modulation. This option is very expensive and is not practical, since the set-top box is not capable of receiving 8-VSB signals via existing HFC networks. Moreover, cable operators have a need to distribute IP data as well as audio/video services between a master headend and remote headends which are distributed throughout the cable network.

There are several options for providing the transport of IP data via an existing HFC network. One option is to outfit each of the cable operators' remote headend systems with a dedicated digital interface card, such as a DS-3 card that can handle full duplex IP data transport. DS-3 is a framing specification for digital signals in the North American digital transmission hierarchy. A DS-3 signal has a transmission rate of 44.736 megabits per second. DS-3 is used, for example, on T3 synchronous integrated services digital network (ISDN) lines. The advantage of providing a dedicated DS-3 interface card at each remote site is that the entire DS-3 frame's payload carrying capacity is available for downstream and upstream IP data. A possible disadvantage is that the number of STS-1 (synchronous transport signal) time slots available for distribution of video/audio services on the synchronous optical network (SONET) ring is reduced by one. This problem can be solved, for example, by replacing the DS-3 interface with a 155 Mb/s rate OC-3 interface. Due to its high data rate, the OC-3 interface is more costly to implement than the DS-3 interface.

It would be advantageous to provide a method for transporting IP data using a DS-3 interface. It would be further advantageous to provide such a method that is fully compatible with existing HFC networks used for cable television communication.

The present invention provides a method having the aforementioned and other advantages. In particular, the present invention transports IP data within a DS-3 frame that also carries MPEG-2 programs. In this manner, one STS-1 time slot can be shared for full duplex transport of both MPEG-2 programs and IP data. Moreover, the technique of the present invention enables the available DS-3 payload to be maximized.

SUMMARY OF THE INVENTION

In accordance with the present invention, a method is provided for transporting variable length packets and fixed length packets of length N in standard digital transmission frames. Each frame comprises a plurality P of sections having a fixed length M, which is greater than the length N. In order to transport the variable length packets, a fixed length trailer is added to each of the variable length packets. Each variable length packet with the added trailer is segmented into an integer number of segmented packets of lengths N. Padding bits are added, if necessary, to provide the integer number of segmented packets. At least one of a header and trailer is added to each of the segmented packets and fixed length packets. This step expands each segmented and fixed length packet to an expanded packet length M. P of the expanded packets are then combined into a frame for transmission as a standard digital transmission frame.

The standard digital transmission frames may include Q parity bits in addition to the P fixed length sections. In such an implementation, Q parity bits are added to the P expanded packets to form the standard digital transmission frame.

The fixed length trailer is added to each of the variable length packets at a first protocol layer (e.g., an adaptation layer of a communication protocol). The header and/or trailer is added to each of the segmented packets and fixed length packets at a second protocol layer (e.g., an IP/MPEG layer of the communication protocol). The first protocol layer communicates with the second protocol layer to identify the last segmented packet corresponding to a variable length packet. This enables segmentation control fields to be set for the segmented packets at the second adaptation layer.

In an illustrated embodiment, the standard digital transmission frames comprise DS-3 frames of a digital communication network. The variable length packets comprise Internet protocol (IP) datagrams. The fixed length packets comprise MPEG video packets.

In the illustrated embodiment, the fixed length trailer includes a packet length field. A header is added to each of the segmented packets and fixed length packets to form the expanded packets, and includes a packet byte field, a segmentation control field and a sequence number field. The fixed length trailer can further include a cyclic redundancy code (CRC) field. The header can further include a configuration mode field. The fixed length trailer and the header can also each include an additional field (e.g., a reserved field) for providing optional features. Moreover, a trailer including a plurality of parity bytes can be added to each of the segmented packets and fixed length packets.

In a specific embodiment, the fixed length MPEG video packets are each 188 bytes in length. The variable length packets are segmented into 188-byte segmented packets. A header and trailer, together comprising 8 bytes, are added to the MPEG video packets and segmented packets to provide 196-byte expanded packets. Three of the expanded packets are combined together with 7 bytes of parity data to create DS-3 frames having a length of 595 bytes each.

DETAILED DESCRIPTION OF THE INVENTION

The present invention provides a method for transporting variable length and fixed length packets in standard digital transmission frames. Although not limited to any particular application or implementation, the invention is particularly useful in distributing television audio/video services as well as IP data between a master headend and remote headends and an HFC cable television system.

Figure 1:
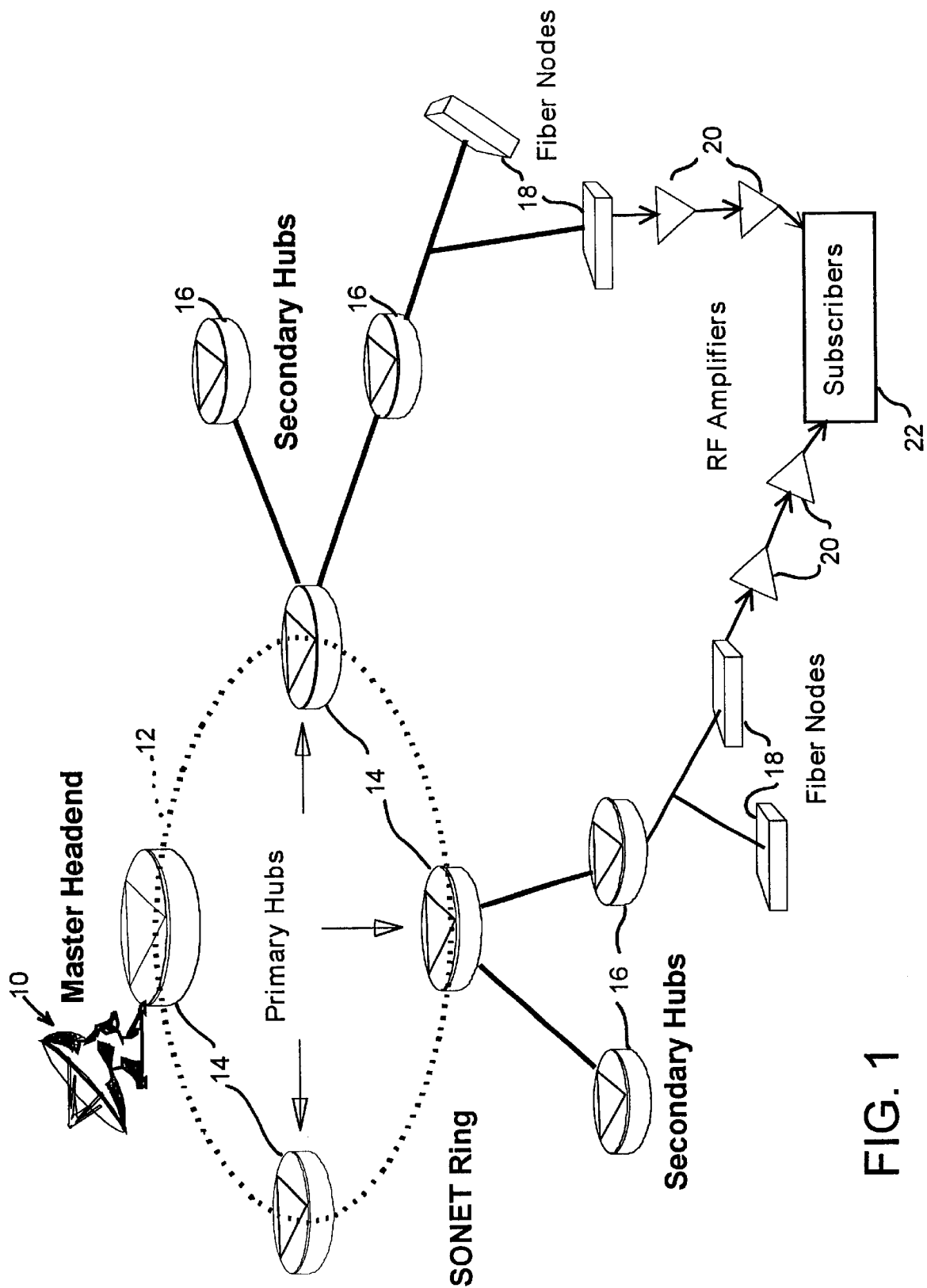
FIG. 1 is a block diagram illustrating an overview of an HFC cable television network architecture.

FIG. 1 illustrates a typical HFC network architecture, where a master headend 10 is connected to various primary hubs 14 via a SONET fiber optic ring 12 carrying, e.g., "optical carrier 48" (OC-48) traffic. Such traffic is carried at a SONET rate of 48*51.84=2488.32 megabits per second. The primary hubs 14 may also be connected to secondary hubs 16 (also referred to as remote headends) using a fiber optic star or ring configuration carrying, e.g., "optical carrier 3" (OC-3) rate traffic. Optical carrier 3 traffic is carried at a SONET rate of 3*51.84=155.52 megabits per second.

The secondary hubs are connected to various subscribers 22 using a tree and HFC architecture as illustrated. In particular, signals from the secondary hubs 16 are coupled via fiber nodes 18 to various branches of the network which ultimately lead to different subscribers 22. RF amplifiers 20 are provided along the HFC path to amplify the signals as they are carried to the subscribers.

The master headend 10 can receive analog and digital video signals via various L band receivers, as well known in the art. For example, an 8-VSB receiver can be provided to allow cable system operators to receive and demodulate terrestrial high definition television signals at the master headend. An MPEG-2 video stream can be multiplexed and encrypted with other MPEG-2 streams using remultiplexer and encryption hardware/software. To provide the high definition television signals to subscribers, the multiplexed video streams can be sent to a quadrature amplitude modulation (QAM) modulator, and up-converted to the desired RF channel frequency. The transmitted HD signals are decoded by each authorized subscriber's digital set-top box and displayed on the subscriber's digital television (DTV). A quadrature phase shift keyed (QPSK) transmitter operating, e.g., at 70 MHz, can be provided for satellite uplink transmission of control commands.

In accordance with the present invention, both television data (e.g., MPEG-2) and Internet protocol (IP) data are transported from the master headend 10 via the HFC network to subscribers 22. Mapping IP data into the digital format (e.g., DS-3) used over the SONET ring requires segmentation of the input Ethernet frames carrying the IP data. Ethernet® is a bus-based broadcast network with decentralized control operating at 10 or 100 Mbps. Computers on an Ethernet network can transmit whenever they want to. If two or more packets collide, each computer waits a random time and tries again later. Variable Ethernet frames may span multiple DS-3 frames, which requires a protocol layer above the DS-3 frames to handle Ethernet frame segmentation and reassembly.

Figure 2:
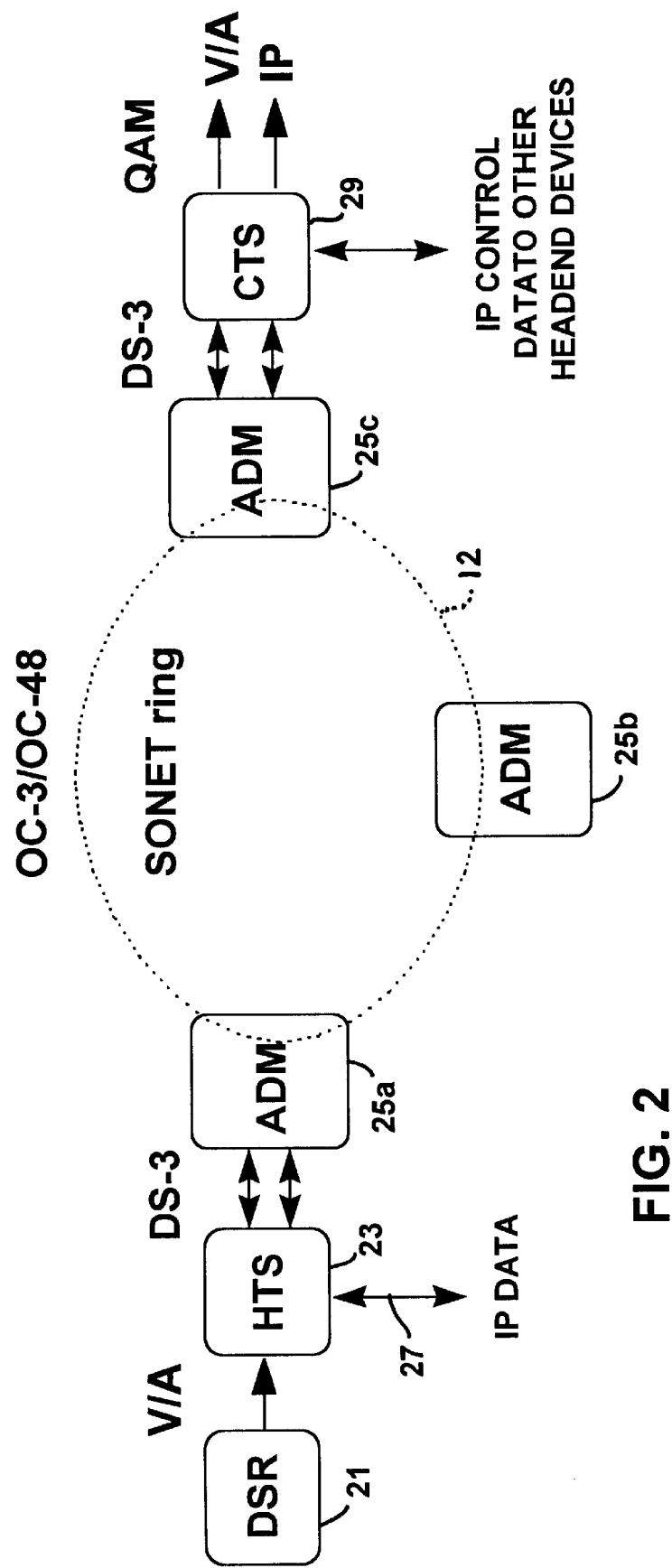
FIG. 2 is a block diagram showing the hardware components of a system implementing the invention.

The DS-3 frames in accordance with the invention consist of MPEG-2 packets, containing digital video/audio packets and IP datagrams. These frames are transmitted from the master headend 10 to the primary and/or secondary headends 14, 16 respectively using Add/Drop Multiplexers (ADM) 25 that provide points of entry into the SONET ring 12 as shown in FIG. 2. A Digital Satellite receiver (DSR) 21 receives the digital video/audio (V/A) signals from various satellite sources and converts them to digital baseband signals. A Host Transcoder System (HTS) 23, which accepts baseband digital video/audio signals from the DSR and IP data via line 27, transcodes the input signals to DS-3 frames. The HTS can also output IP data over line 27 to other network devices.

At the receiving end, a client Transcoder System (CTS) 29 receives the DS-3 frames and outputs quadrature amplitude modulation (QAM) modulated IF Video/Audio signals and/or IP data for communication to subscribers. The CTS can also transmit IP control data to other primary and/or secondary headend devices. IP control data is IP data used specifically to control various network devices such as CTS and subscriber terminal equipment. The transcoding function of both the HTS and CTS consists of multiplexing and de-multiplexing as well as encryption and decryption, respectively.

As mentioned above, a mapping function is required to map IP data into the digital format used over the SONET ring. The present invention provides such a function by using a novel MPEG-2 to DS-3 M-frame mapping scheme. In the DS-3 protocol, an M-frame structure is used wherein each M-frame is 4,760 bits long. The first and every subsequent 85th bit is an overhead bit. The remaining 84 of each 85 bits is DS-3 payload. Thus, 4704 bits in the frame are DS-3 payload.

The present invention maps IP datagrams into multiple 188-byte structures intended to carry MPEG-2 packets. This approach facilitates the carriage of IP data along with MPEG-2 programs. Moreover, reduced overhead is required than with prior art approaches.

Each IP datagram is a self-contained, independent entity of data carrying sufficient information to be routed from the source to the destination. By mapping such datagrams into the standard 188-byte MPEG format, both the variable length IP datagrams and the fixed length MPEG packet can be communicated interchangeably in an efficient manner. In order to accomplish this, 196-byte "sections" of the IP datagrams transmitted according to the DS-3 protocol are mapped to 188-byte packets. More specifically, the 4704 bits of each DS-3 M-frame are divided into three sections of 1568 bits (or 196 bytes) each. The first section starts with the first payload bit immediately following the M-frame sync and the third section ends with the last payload bit before the next M-frame sync. Each section consists of a header, a data field, and Reed-Solomon parity bits.

Figure 3:
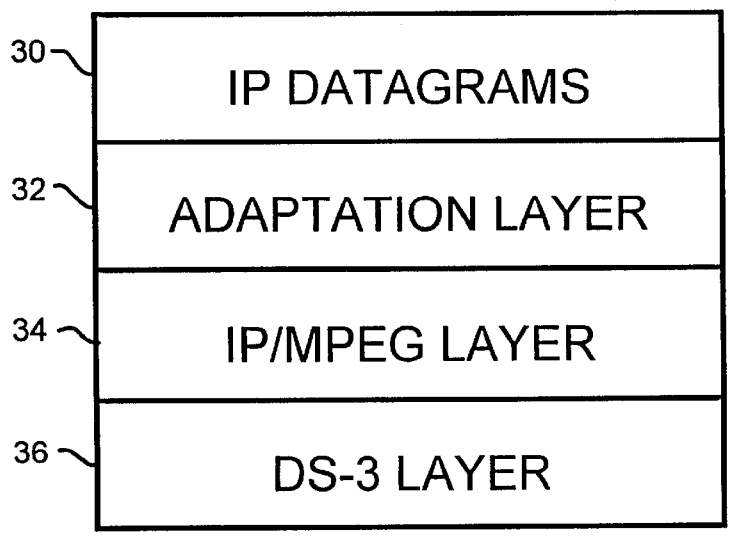
FIG. 3 is a protocol hierarchy that maps IP datagrams to a DS-3 layer in accordance with the present invention.

The IP datagram to DS-3 mapping model of the present invention is illustrated in FIG. 3. As indicated above, this mapping model enables the simultaneous transmission of IP datagrams and MPEG video packets within a DS-3 frame. The mapping model of FIG. 2 provides a scheme to fit the IP datagrams into fixed length DS-3 frames. The IP datagrams 30 reside at the highest level of the model. The next level down is an adaptation layer 32. At the adaptation layer, a fixed-length trailer (T) is attached to each of the incoming IP datagrams. These datagrams are variable length IP packets up to 65,536 bits ($2^{16}$). The adaptation layer is followed by an IP/MPEG layer 34. A DS-3 layer 36 resides at the bottom of the protocol stack.

Figure 4:
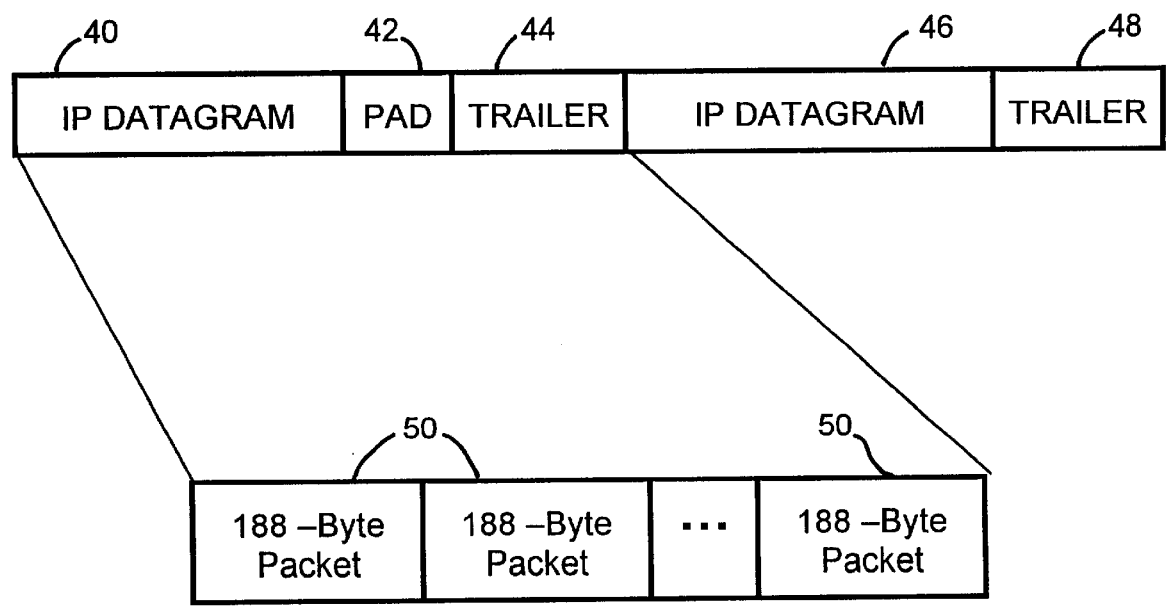
FIG. 4 illustrates a scheme for mapping IP datagrams to consecutive 188-byte packets in accordance with the present invention.

As illustrated in FIG. 4, incoming IP datagrams 40 together with the fixed-length trailer 44 and any necessary padding bits 42 (e.g., nulls) are segmented into an integer number of 188-byte long packets 50. In the segmentation process, any fractional IP packet to be processed after the remainder of the IP datagram has been segmented into 188-byte packets is padded with the padding bits (nulls) 42, to provide a final 188-byte long packet for the datagram.

Figure 5:
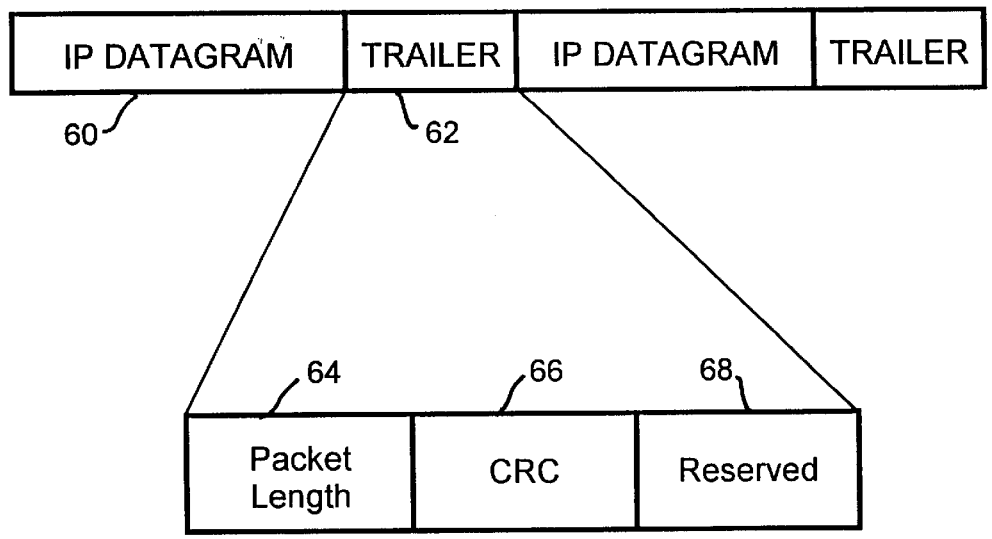
FIG. 5 illustrates, in greater detail, the trailer appended to the IP datagrams.

As illustrated in FIG. 5, the trailer 62 of each IP datagram 60 consists of three fields. These are a packet length field 64, a cyclic redundancy code (CRC) field 66, and a reserved field 68. The CRC field can comprise, for example, a standard 16-bit or 32-bit checksum over the entire message. The reserved field 68 is available for optional services that may be desired, such as providing IP control data between the HTS' and various CTS' in the network. It is noted that the IP datagram 60 and trailer 62 of FIG. 5 correspond to the same components 40,44 in FIG. 4.

Figure 6:
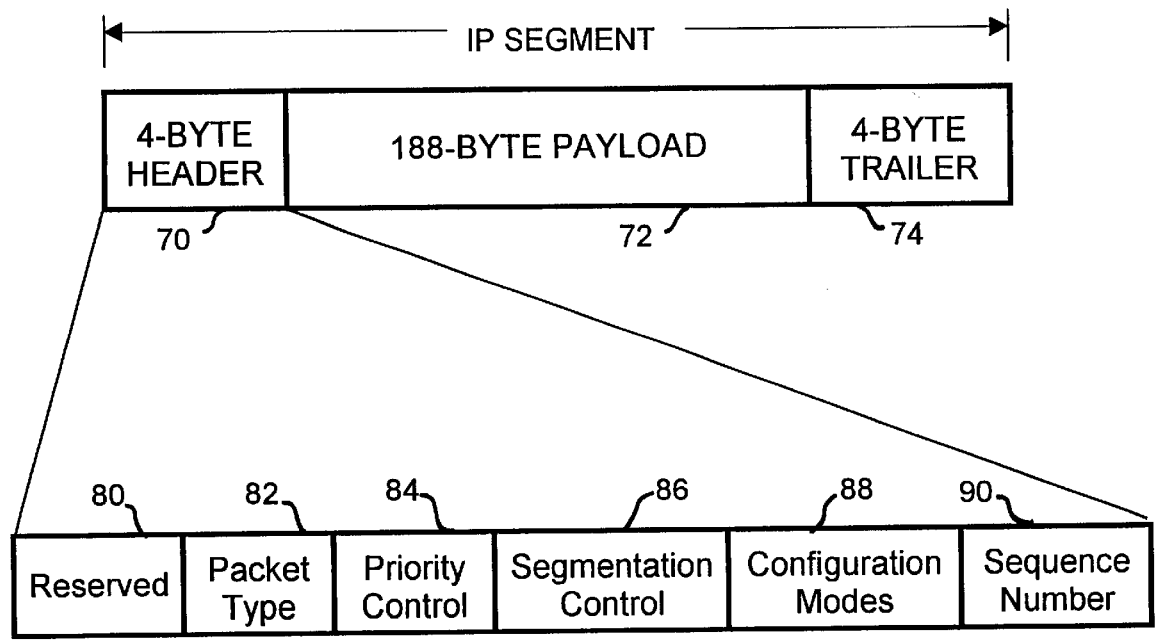
FIG. 6 illustrates an IP segment in accordance with the present invention with details of the segment header.

After segmentation into the 188-byte packets as illustrated in FIGS. 4 and 5, a 4-byte header and a 4-byte trailer are added to each of the 188 byte long packets at the IP/MPEG layer 34 (FIG. 3) The formation of an IP segment by appending the header 70 and trailer 74 to the 188-byte payload 72 (equivalent to a 188-byte packet 50 shown in FIG. 4) is illustrated in FIG. 6. It is noted that the header and trailer are added to both MPEG and IP payloads. After appending the header and trailer, the resultant segments are 196 bytes long, which corresponds to the 196-byte sections used in the DS-3 protocol.

The 4 byte long header 70 consists of six fields, as illustrated in FIG. 6. These include a 1 byte long reserved field 80 for providing desired options. A packet type field 82, which is 2 bits in length, identifies the payload type, i.e., MPEG or IP. A 2-bit priority control field 84 provides flexibility to prioritize the various input packets to be carried over the DS-3 frame. A segmentation control field 86, also 2 bits, is set to "0" for sequential 188-byte packets, and set to "1" for the last 188-byte packet from a single IP datagram. There is a handshake between the adaptation layer 32 and the IP/MPEG layer 34 (FIG. 3) to determine when the last 188-byte packet has occurred. This handshake enables the segmentation control field to be set to "1" indicating the last 188-byte packet from a single IP datagram. A 2-bit configuration mode field 88 is provided to enable the system to be set to different operating modes, such as different clock and/or information rates. A sequence number field 90 is a counter that identifies the sequence of the present 188-byte packet.

The 4-byte trailer 74 attached to the 188-byte payload 72, as illustrated in FIG. 6, consists simply of four bytes of parity information. For example, this can comprise Reed-Solomon parity, and is used to correct potential errors during the transmission process in a conventional manner.

To fit into a fixed length DS-3 frame, three IP segments are required. The three IP segments add up to a total of 588 bytes (196*3), and when combined with the 56 bits (7 bytes) of standard DS-3 parity, provide a standard 595 byte DS-3 frame size.

It should now be appreciated that the present invention provides a method for transporting variable length packets, such as IP datagrams together with fixed length packets, such as MPEG packets, in a standard digital transmission frame such as a DS-3 protocol frame. Segmentation of the variable length packets and the addition of various headers and trailers enable expanded packets to be combined into a frame for transmission as a standard digital transmission frame. Padding bits are provided when required to create an integer number of fixed length packets from a variable length datagram.

Although the invention has been described in connection with a specific embodiment, it should be appreciated that numerous adaptations and modifications may be made thereto without departing from the scope of the following claims.

What is claimed:

1. A method for transporting variable length packets and fixed length packets of length N in standard digital transmission frames, each frame comprising a plurality P of sections having a fixed length M>N, comprising the steps of:

adding a fixed length trailer to each of said variable length packets;

segmenting each variable length packet with the added trailer into an integer number of segmented packets of length N, adding padding bits if necessary to provide said integer number of segmented packets;

adding at least one of a header and trailer to each of said segmented packets and fixed length packets to expand each segmented and fixed length packet to an expanded packet length M; and combining P of said expanded packets into a frame for transmission as a standard digital transmission frame.

2. A method in accordance with claim 1 wherein said standard digital transmission frames include Q parity bits in addition to said P fixed length sections, said method comprising the further step of:

adding Q parity bits to the P expanded packets to form said standard digital transmission frame.

3. A method in accordance with claim 1 wherein said fixed length trailer is added to each of said variable length packets at a first protocol layer and said at least one of a header and trailer is added to each of said segmented packets and fixed length packets at a second protocol layer.

4. A method in accordance with claim 3 wherein said first protocol layer communicates with said second protocol layer to identify the last segmented packet corresponding to a variable length packet, thereby enabling segmentation control fields to be set for the segmented packets at said second adaptation layer.

5. A method in accordance with claim 1 wherein said standard digital transmission frames comprise DS-3 frames of a digital communication network.

6. A method in accordance with claim 5 wherein said variable length packets comprise Internet Protocol (IP) datagrams and said fixed length packets comprise MPEG video packets.

7. A method in accordance with claim 6 wherein said fixed length trailer includes a packet length field.

8. A method in accordance with claim 7 wherein a header added to each of said segmented packets and fixed length packets to form said expanded packets includes a packet byte field, a segmentation control field, and a sequence number field.

9. A method in accordance with claim 8 wherein said fixed length trailer further includes a cyclic redundancy code (CRC) field and said header further includes a configuration mode field.

10. A method in accordance with claim 9 wherein said fixed length trailer and said header each include an additional field for providing optional features.

11. A method in accordance with claim 10 wherein a trailer added to each of said segmented packets and fixed length packets includes a plurality of parity bytes.

12. A method in accordance with claim 6 wherein said fixed length MPEG video packets are each 188 bytes in length, said variable length packets are segmented into 188 byte segmented packets, a header and trailer together comprising eight bytes are added to the MPEG video packets and segmented packets to provide 196 byte expanded packets, and three of said expanded packets are combined together with seven bytes of parity data to create DS-3 frames having a length of 595 bytes each.

* * * * *